Nov. 13, 1945.    L. H. BROWN    2,388,673
DUAL POWER OPTICAL SYSTEM
Filed June 9, 1944
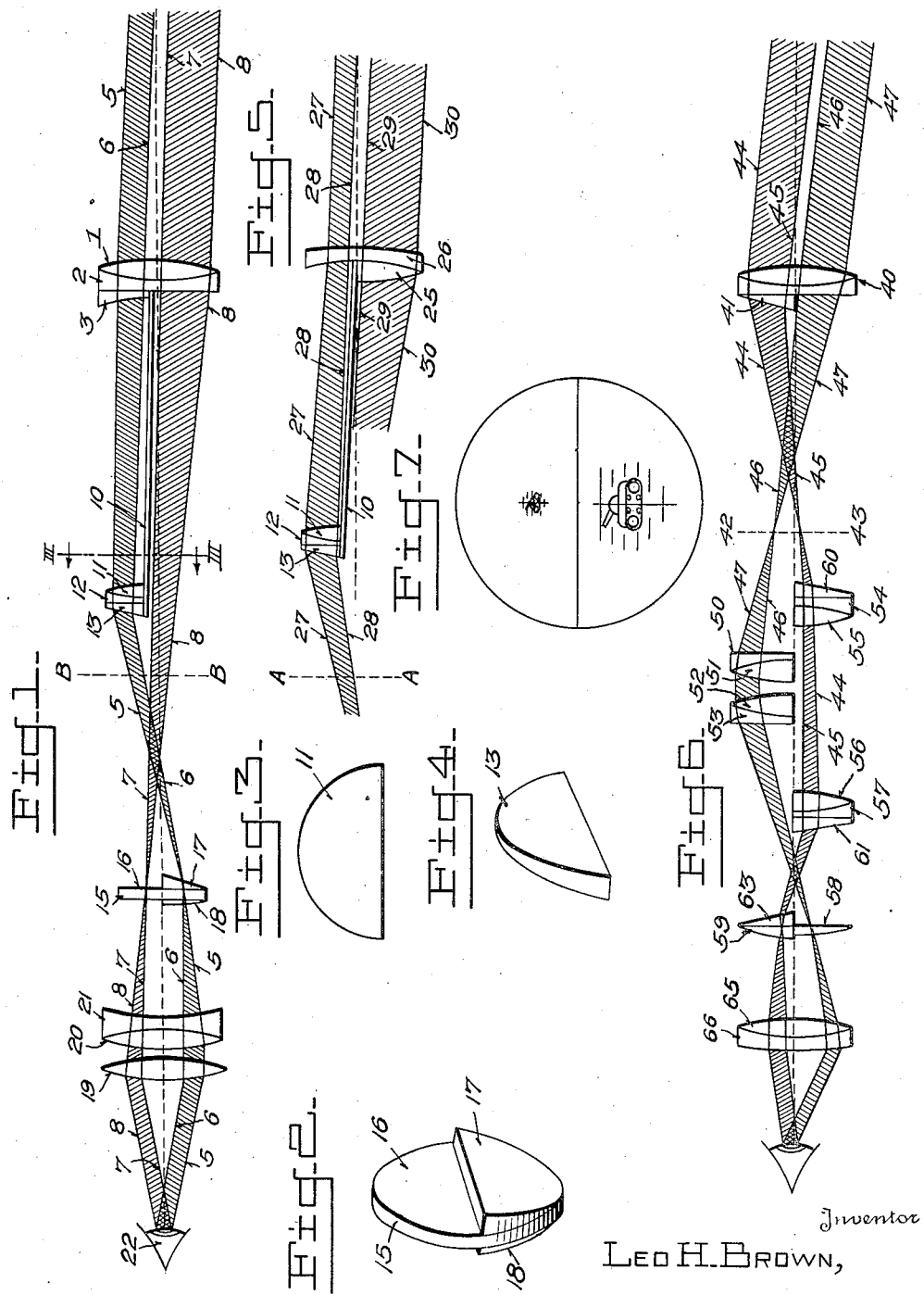
Inventor
LEO H. BROWN,
By C. E. Herrstrom + H. E. Thibodeau
Attorneys Patented Nov. 13, 1945

2,388,673

UNITED STATES PATENT OFFICE 2,388,673

DUAL POWER OPTICAL SYSTEM

Leo H. Brown, Glenville, Conn.

Application June 9, 1944, Serial No. 539,506

3 Claims. (Cl. 88—32)

(Granted under the act of March 3, 1883, as amended April 30, 1928; 370 O. G. 757)

The invention described herein may be manufactured and used by or for the Government for governmental purposes, without the payment to me of any royalty thereon.

The present invention relates to dual power split field optical systems.

An object of the invention is the provision of a telescope or optical system which enables an object to be viewed under two different magnifications simultaneously with the same eye-piece, the view with one magnification appearing in one part of the field and the view with the other magnification appearing in another part of the field. The field, by which is meant what is seen in the eyepiece of the system, is divided into two parts, one part of which contains the scene under low magnification, and the other part of which contains the scene under a higher magnification. This division occurs preferably along a straight line diametrically across the field, whereby one half of it is under low magnification and the other half of it is under a higher magnification.

It will be understood, of course, that the higher magnification part of the field of view contains less of the actual expanse of the scene or objects viewed with the optical system than the low power part of the field of view, but that those parts of the scene or objects in the high power part of the field appear larger than the same parts of the scene or the same objects appearing in the low power part of the field of view.

The invention is of utility in telescopic sights for guns and in viewing telescopes for general observation.

In the low power part of the field, a gunner or observer can quickly find the target because of the large field of view. This is difficult to accomplish with a high power system, since a high power system includes in its field a comparatively small area of view.

When a reticle in a low power system has been placed upon the image of the target, the same target under higher magnification appears in the high power part of the field. The system or telescope may now be easily moved in elevation or azimuth to place the line of sight, or a reticle in a high power part of the field, upon any desired part of the image of the object in the high power part of the field of view.

Thus, the present optical system renders it comparatively easy to find a target and then to fix a line of sight on a highly magnified image of the target; or to find the target again easily, in case the target moves out of the field of view; or to keep the target in sight, in case the optical system is mounted on a vehicle, such as a combat tank, which by its motion or change of direction of motion would cause the target to move out of the field of view.

Optical systems or telescopes conforming with the present invention are illustrated in the accompanying drawing, wherein tubes and mountings customarily used for optical elements in telescopic systems are omitted in the interest of simplification of the drawing and since the disclosures of these are unnecessary to the understanding of the invention by persons skilled in the art. Diaphragms used to block-off unwanted rays of light are also omitted for the same reasons.

In the accompanying drawing,

Figure 1 is a longitudinal section of a telescope embodying one modification of the optical system, the section being taken through the optical axis.

Figure 2 is an enlarged perspective view of the reticle plate disclosed in Figure 1 showing a wedge or prism and a converging half lens cemented thereto.

Figure 3 is an enlarged elevation of the low power objective of Figure 1 looking towards the left from line III—III Figure 1.

Figure 4 is a perspective view of the prismatic wedge associated with the low power objective of Figure 1.

Figure 5 is a partial longitudinal section of a telescope embodying the optical system illustrated in Figure 1 but with a different form of high power objective, the parts (not shown) to the left of line A—A in Figure 5 being the same as the parts to the left of line B—B in Figure 1 and similarly positioned.

Figure 6 is a longitudinal section of a telescope embodying another form of the optical system of the invention, the section being taken through the optical axis.

Figure 7 is an example of the appearance of the field of view in the eye-piece of the telescopes illustrated in Figures 1, 5 and 6, showing a combat tank in each part of the divided field under different magnifications.

A converging lens gives a real image of an object when that object lies further from the lens than the focal point of the lens, regardless whether only a part or the whole of the aperture of the lens is used. Thus, if half the area of the lens is covered with an opaque material, the other half will nevertheless give a real image of the object at the same position, and of the same size, as the image formed when using the entire aperture. The present invention is based upon the above scientific fact.

Since objects or scenes viewed by a telescope are at a great distance from the telescope in comparison with the focal length of the objective, the real image formed by the objective will lie for all practical purposes in the focal plane of the objective. It will therefore be seen, that the real image at the focal plane can be considered as made up of two images which are exactly superimposed, one of said images arising from one segment or part of the objective on one side of a chord thereof and the other of said images arising from the part or segment of said objective on the other side of said chord. Said chord may be the diameter of the objective, although any chord may be chosen.

The present invention operates upon the bundle of rays of light from each of the said two parts of the objective so as to produce deviation between them, thereby separating the said two superimposed images from each other. Either before or after said deviation one or both of said bundle of rays is operated upon by a converging lens or converging lens system to form a smaller image of the object from one of them than the image formed from the other of them. In order that these two different sized images may be viewed by a single eye-piece, the converging lens or lens systems referred to is so positioned and dimensioned as to cause the two different sized images to be formed in a common plane. It will now be apparent that if a single eye-piece is used to view the two separated images of different size in the said plane, a magnified image of each of them will be obtained, and one of them will appear larger than the other in the eye-piece. Thus, the object may be viewed in the eye-piece under two different degrees of magnification in the same field of view.

In Figure 1 of the accompanying drawing, numerals 1 and 2 indicate respectively a converging and diverging lens forming an achromatic lens combination, and together referred to herein generally as an objective or objective lens. Half, or about half of this objective lens is covered on its inner face by a diverging lens 3, which for the most part, or wholly, neutralizes the converging effect of the objective.

Lines 5 and 6 in Figure 1 define the outer lateral limits of a bundle of light rays coming from a point on the target or object viewed, and entering the upper half of the objective as viewed in the drawing. Lines 7 and 8 define the outer lateral limits of another bundle of rays coming from the same point of the target or object viewed and entering the lower part of the objective, as viewed in the drawing. The paths that these two bundles of rays take while passing through the optical system are shown in Figure 1. The area between lines 5 and 6, and the area between lines 7 and 8, throughout the section of the figure, is crosshatched, in order that the two bundles of light rays may be easily followed through the optical system.

A division diaphragm 10 extends rearwardly from the objective lens and from the bottom of half lens 3. This diaphragm divides the objective into two parts substantially at the diameter parallel to the bottom of lens 3. The diaphragm is slightly inclined to the optical axis of the objective so that its innermost end is slightly higher than the end adjacent the lens 3. The said diaphragm extends throughout its length entirely across the optical system, that is to say, entirely across the tube or cylinder in which the system is mounted.

At the inner end of the diaphragm 10 is carried a converging achromatic lens combination consisting of a converging half lens 11 and diverging half lens 12. Adjacent the diverging half lens 12 is a deviating wedge or prism 13. Lenses 11 and 12 constitute an achromatic low power objective or objective lens for the bundle of light rays defined by lines 5 and 6, whereas the lower half of lenses 1 and 2 constitute an achromatic high power objective for the bundle of light rays defined by lines 7 and 8.

A reticle plate 15 is provided with a reticle on the surface 16 thereof and also with a deviating wedge 17 and a plano-convex half lens 18. Deviating wedge 17 is cemented on the lower half of surface 16 of reticle plate 15 while plano-convex half lens 18 is cemented to the lower half of the opposite side of the reticle plate. Plano-convex half lens 18 is used to position the eye-point for bundle of rays 5—6 the same distance from the eye-piece as the eye point for bundle of rays 7—8. If half lens 18 were omitted, the eye point for bundle of rays 5—6 would be further from the eye-piece, since the objective for bundle of rays 5—6 is of shorter focal length than the objective for bundle of rays 7—8. Bundle of light rays 7—8 pass through lenses 1 and 2 and are brought to focus at the surface 16 of reticle plate 15, and represent one of the two of the images referred to above. The bundle of rays 5—6 pass through lenses 1, 2 and 3; thereafter they pass through lenses 11 and 12 which cause them to converge, and thereafter they are deviated or bent by prism 13 so as to enter the prism 17 and plano-convex lens 18 on the reticle plate 15. The focal length of the lens combination consisting of lenses 11 and 12 is shorter than the focal length of the lens combination consisting of lenses 1 and 2, and the said combination of lenses 11 and 12 is so positioned that the bundle of rays 5—6, representing the other of said two images, is brought to focus at the surface 16 of the reticle plate behind the deviating wedge 17. The wedge 17 is used to bend the bundle of light rays 5—6 in such direction that they may be able to enter an eye-piece along with bundle of rays, such as bundle 7—8, from the lower segment of lenses 1 and 2.

It will, therefore, be understood from the foregoing that a segment of lenses 1 and 2 constitute a high power objective, and segment lenses 11 and 12 constitute a low power objective, owing to the fact that the former has a longer focal length than the latter, and magnifying power of a telescope is the number obtained by dividing the focal length of the objective by the focal length of the eye-piece used to view the image formed by the objective.

Any suitable eye-piece may be used in connection with reticle plate 15 to view the two separated images and the reticle on the plate. In Figure 1, the eye-piece is indicated as an achromatic combination of lenses consisting of converging lenses 19 and 20, and diverging lens 21. Bundle of rays 5—6, and bundle of rays 7—8 emerge from the eye-piece, and enter the eye 22 of the user as shown in Figure 1.

Instead of the high power objective shown in the telescopic system shown in Figure 1, there may be used the high power objective shown in Figure 5. This objective consists of a converging half lens 25 and a diverging full lens 26. In this figure, lines 27 and 28 define a bundle of rays corresponding to bundle of rays 5—6; and the bundle of rays comprised between lines 29 and 30 corresponds to the bundle of rays between lines 7 and 8. In this modification of the invention the diaphragm 10, lenses 11 and 12 and deviating prism or wedge (also shown in Fig. 1) are also used. However, as the bundle of rays 27—28 spread more after passage through lens 26 than bundle of rays 5—6 after passage through lenses 1, 2 and 3, lenses 11 and 12 and prism 13 are placed nearer to lenses 25 and 26 than to lenses 1 and 2, when, as understood herein, lens combination 11 and 12 have the same focal length in the modification illustrated in Figure 1. The parts (not shown) to the left of line A—A in Figure 5 are the same as the parts to the left of line B—B in Figure 1. It will, of course, be understood now that the lenses 11 and 12 and prism 13 in Figure 5 are so located as to bring the bundle of rays 27—28 to focus in the same plane in which the bundle of rays 29—30 is brought to focus, and that this plane corresponds to the surface 16 of reticle plate 15 in Figure 1.

In the optical systems described above, erecting mirrors, lenses or prisms may be placed between the eye-piece and the low power objective to produce erect images instead of inverted images.

The modification of the invention illustrated in Figure 6 comprises an achromatic objective lens combination 40 indicated as composed of a converging and a diverging lens. Half of the rear of this objective lens is covered by a deviating prism 41. Parallel rays of light, or rays of light coming from the same point on the object viewed, passing through the part of the objective which is not covered by the deviating prism, as well as like rays of light which pass through the part of the objective that is covered by the prism, are brought to focus in a common plane indicated by the line 42, 43. Were it not for the presence of deviating prism 41, bundle of rays 44—45 and bundle of rays 46—47 would be brought to focus at the same point in plane 42—43, since the two bundles of rays 44—45 and 46—47 are considered as coming from the same point on a distant object. The wedge or prism 41, therefore, effects separation of two images from a single image that would be formed in the absence of prism 41.

To the left of the focal plane 42—43, are two erecting systems each composed of four half lenses as shown. Half lenses 50, 51, 52 and 53 constitute a high power magnifying and erecting system, and half lenses 54, 55, 56, and 57 constitute a lower power magnifying and erecting system. The high power erecting system brings the bundle of light rays 46—47 to focus on the plane surface of plano-convex half lens 58, while the low power erecting system brings the bundle of light rays 44—45 to focus on the plane surface of plano-convex half lens 59. The plane surfaces of plano-convex lenses 58 and 59 lie in the same plane, but the focal lengths of plano-convex lenses 58 and 59 are different and so chosen that the eye-point for bundle of rays 44—45 is the same distance from the eye-piece as the eye-point for bundle of rays 46—47. Deviating wedges or prisms 60 and 61 are placed in the lower power magnifying and erecting system to direct ultimately the bundle of rays 44—45 to deviating wedge or prism 63 cemented over the half lens 59. A suitable reticle is carried on the plane surfaces of lenses 58 and 59.

An eye-piece of any suitable construction may be used in connection with the modification of the telescope system illustrated in Figure 6. The eye-piece shown is composed of a converging lens 65 cemented to a diverging lens 66, the glasses of both lenses being chosen with regard to correcting chromatic aberration.

At the plane 42—43, separation of two images of the object is produced. Except for the deviating effect of prism 41, these images would be merged as one image as explained in earlier parts of this description. Bundle of light rays 44—45, and bundle of light rays 46—47, are representative of these two images. The bundle of rays 44—45 proceed from focal plane 42—43 through the low power magnifying and erecting system as shown, and are brought to focus on the plane surface of lens 59 after being deviated by wedge 63. Bundle of rays 46—47 proceed, as shown, from focal plane 42—43 through the high power magnifying and erecting system and are brought to focus on the plane surface of lens 58, as shown in the drawings. The eye-piece then forms real magnified images of the separated images of the same object.

It will, therefore, be seen that two separate images of the same scene or object appear in different magnifications in the same eyepiece in each of the modifications of the invention described above. Figure 7 illustrates an example of a divided field obtained according to the present invention. As the field of view is oriented in the drawing, the upper half is a view of the scene or object under low magnification, whereas the lower half of the field of view is a view of the scene or object under a high magnification. The objects illustrated in the two parts of the field are two separate images of the same combat tank. The sighter or gunner finds the target, for example the tank, in the low power part of the field, and then places the reticle lines in the high power part of the field on the desired part of the magnified image of the target in the high power part of the field.

I claim:

1. A telescopic optical system comprising a first segment of a converging lens of one focal length, a second segment of a converging lens of a different focal length, the focal length of the said first segment being shorter than the focal length of the said second segment, a wedge adjacent said first segment in the path of light from said first segment for bending light rays towards the principal axis of the said segment, said two segments being so positioned as to form real images of an object in a common plane; a wedge near said plane operative upon light proceeding from said first segment towards said plane, said wedge deviating said light towards the center line of the system; and converging lens means near said plane operative upon light proceeding from said first segment to said plane for positioning the eye point for this light at the same distance from an eye piece as the eye point for the light rays operated upon by the said second segment, when the light passing through said plane is viewed with the same eye piece.

2. A telescopic optical system comprising an objective having a first segment thereof which converges light from a point on an object less than a second segment thereof which converges light coming from the same point of the object; converging lens means, and light deviating means for deviating light rays towards the axis of the system, said converging lens means and light deviating means being placed in the path of the light rays operated upon by the said first segment and bringing the light rays on which they operate to focus in a plane which coincides with the plane in which light rays operated upon by said second segment are brought to focus; a second light deviating means operative on light rays proceeding to said plane from said first mentioned converging lens means and said first mentioned light deviating means, for bending the light rays towards the axis of the system; converging lens means operative upon the light rays operated upon by said second light deviating means for positioning the eye point for these light rays at the same distance from an eye piece as the eye point for the light rays operated upon by the said second segment, when the light rays passing through said plane are viewed with the same eye piece; and an eye piece for rays passing through said plane.

3. A telescopic optical system comprising an objective having a first segment thereof which diverges light rays coming from a point on an object and a second segment thereof which converges light rays coming from the same point of the object; converging lens means, and light deviating means for deviating light towards the axis of the system, said converging lens means and light deviating means being placed in the path of the light rays operated upon by the said first segment and bringing the light rays on which they operate to focus in a plane which coincides with the plane in which light rays operated upon by said second segment are brought to focus; a second light deviating means operative on light rays proceeding to said plane from said first mentioned converging lens means and said first mentioned light deviating means, for bending the light rays towards the axis of the system; converging lens means operative upon the light rays operated upon by said second light deviating means for positioning the eye point for these light rays at the same distance from an eye piece as the eye point for light rays operated upon by the said second segment, when the light rays passing through said plane are viewed with the same eye piece; and an eye piece for light rays passing through said plane.

LEO H. BROWN.